United States Patent
Baik

(10) Patent No.: US 11,981,191 B2
(45) Date of Patent: May 14, 2024

(54) OPENING AND CLOSING STRUCTURE OF SLIDING DOOR FOR VEHICLE

(71) Applicants: HYUNDAI MOTOR COMPANY, Seoul (KR); KIA MOTORS CORPORATION, Seoul (KR)

(72) Inventor: In-Chul Baik, Jeonju-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 571 days.

(21) Appl. No.: 17/219,076

(22) Filed: Mar. 31, 2021

(65) Prior Publication Data

US 2022/0194190 A1  Jun. 23, 2022

(30) Foreign Application Priority Data

Dec. 18, 2020  (KR) .......................... 10-2020-0178593

(51) Int. Cl.
*B60J 5/06* (2006.01)
*E05D 15/10* (2006.01)

(52) U.S. Cl.
CPC ............ *B60J 5/06* (2013.01); *E05D 15/1081* (2013.01); *E05D 2015/1026* (2013.01); *E05Y 2201/688* (2013.01); *E05Y 2900/531* (2013.01)

(58) Field of Classification Search
None
See application file for complete search history.

(56) References Cited

U.S. PATENT DOCUMENTS

| 6,932,417 | B2 * | 8/2005 | Barczynski | B60J 5/06 49/213 |
| 7,243,978 | B2 * | 7/2007 | Mather | E05D 15/1081 49/360 |
| 7,753,436 | B2 * | 7/2010 | Kim | E02F 9/0891 49/225 |
| 7,810,864 | B2 * | 10/2010 | Shimizu | E05F 15/44 296/146.4 |
| 8,596,710 | B2 * | 12/2013 | Naeg | B60J 10/86 296/146.4 |

FOREIGN PATENT DOCUMENTS

KR  10-2009-0129194 A  12/2009

* cited by examiner

*Primary Examiner* — Joseph D. Pape
(74) *Attorney, Agent, or Firm* — Morgan, Lewis & Bockius LLP

(57) ABSTRACT

An opening and closing structure of a sliding door for a vehicle includes: a sliding door disposed on a side surface of the vehicle and configured to be slidably open and closed in a longitudinal direction of the vehicle; at least one rail arranged in a longitudinal direction of the vehicle on one of a vehicle body of the vehicle and the sliding door; at least one roller arranged on the other one of the vehicle body and the sliding door, the at least one roller configured to slide while being fitted in the at least one rail; and a sliding unit disposed on a side of the vehicle body or the sliding door on which the at least one roller is arranged, the sliding unit configured to slide the at least one roller in a direction in which the sliding door slides. The at least one roller is configured to slide with respect to the vehicle body and the sliding door.

14 Claims, 13 Drawing Sheets

OPENING AND CLOSING STRUCTURE OF SLIDING DOOR FOR VEHICLE

CROSS-REFERENCE TO RELATED APPLICATION

This application claims the benefit of priority to Korean Patent Application No. 10-2020-0178593, filed on Dec. 18, 2020 in the Korean Intellectual Property Office, which is incorporated herein by reference in its entirety.

TECHNICAL FIELD

The present disclosure relates to an opening and closing structure of a sliding door, which may diversify a front design of a commercial vehicle, and be open and closed in a sliding manner.

BACKGROUND

A front portion of a vehicle such as a commercial vehicle (hereinafter, referred to as 'vehicle'), e.g., a truck, comprises a cabin for a passenger to get on. Such a cabin has a door for the passenger to get on and off Some vehicles are installed with a sliding door, which can be open and closed in a sliding manner so as to be open and closed in a narrow space. As illustrated in FIG. 1, a sliding door 120 for a vehicle has an upper rail 111, a center rail 112, and a lower rail 113 installed on a vehicle body 110 with intervals in a vertical direction of the vehicle. An upper roller 121, a center roller 122, and a lower roller 123 installed on the sliding door 120. The sliding door 120 further includes an arm 124 for installing the rollers 121, 122, 123, such that the rollers 121, 122, 123 are connected to the arm 124 and slidably connected to the rails 111, 112, 113. For example, as illustrated in FIG. 2, the arm 124 is attached to the sliding door 120, and the upper roller 121 is installed on the arm 124 which is connected to the upper rail 111. For the structural stability, the upper roller 121, the center roller 122, and the lower roller 123 are slid on the upper rail 111, the center rail 112, and the lower rail 113, respectively, in a state where each of top, intermediate, and bottom portions of the sliding door 120 is supported, such that the sliding door 120 can be slidably open and closed.

A vehicle is mainly formed in the design of a box shape for the spatial utilization, but in recent years, a front side of the vehicle has an inclined surface or a curved shape in order to improve aesthetic attraction and improve the aerodynamic performance. However, such a design has a shorter length of the upper rail 111 than an opening amount of the top portion of the sliding door 120, such that there is a problem of not sufficiently opening the sliding door 120. As illustrated in FIG. 3, to sufficiently open the sliding door 120, the upper rail 111 should have a length equal to a displacement at which the sliding door 120 slides, but the length of the upper rail 111 is insufficient by 'A' due to the inclination of the front side of the vehicle.

The inclined angle of the front side of the vehicle should be adjusted, and such a measure limits freedom in design and degrades the aerodynamic performance. That is, there is a problem in that, in order for the upper rail 111 to have the sufficient length, the profile taken along the line I-I should be modified to be consistent with the profile taken along the line II-II in FIG. 3.

The contents described in Description of Related Art are to help the understanding of the background of the present disclosure, and may include what is not previously known to those skilled in the art to which the present disclosure pertains.

SUMMARY OF THE DISCLOSURE

The present disclosure is devised to solve the above problem, and an object of the present disclosure is to provide an opening and closing structure of a sliding door for a vehicle, which may sufficiently secure the opening amount of a sliding door even if the inclination is applied to a front design of a commercial vehicle for improving the aesthetic aspect and the aerodynamic performance.

An opening and closing structure of a sliding door for a vehicle according to an aspect of the present disclosure may include: a sliding door disposed on a side surface of the vehicle and configured to be slidably open and closed in a longitudinal direction of the vehicle; at least one rail arranged in a longitudinal direction of the vehicle on one of a vehicle body of the vehicle and the sliding door; at least one roller arranged on the other one of the vehicle body and the sliding door, the at least one roller configured to slide while being fitted in the at least one rail; and a sliding unit disposed on a side of the vehicle body or the sliding door on which the at least one roller is arranged, the sliding unit configured to slide the at least one roller in a direction in which the sliding door slides. The at least one roller is configured to slide with respect to the vehicle body and the sliding door.

A sliding unit, which allows the roller to be slidable on the sliding door, is provided between the sliding door and the roller.

The sliding unit includes: a fixing member installed on the sliding door in the longitudinal direction of the vehicle, and a slider slidably installed on the fixing member, and installed with the roller.

The fixing member is formed with a grip part surrounding the top and bottom of the slider, and the slider is formed with a coupling part coupled to the grip part to constrain the slider with respect to the fixing member in the width direction of the vehicle.

The grip part is formed to have the end bent toward the sliding door to accommodate the coupling part; and the coupling part is formed to be bent in the opposite direction of the grip part to be locked to the grip part.

An elastic member having both ends connected to the fixing member and the slider, respectively is provided.

The sliding unit slides the roller up to the rear end of the rail together in the direction in which the sliding door is opened when the sliding door begins to be opened from the closed state, and the length of the sliding unit is elongated when the roller reaches the rear end of the rail.

The elastic member elastically supports the slider by the fixing member such that the roller slides along the rail earlier than the slider when the sliding door is opened, and the slider slides along the fixing member earlier than the roller when the sliding door is closed.

The elastic member is a return spring formed in a coil spring form.

An upper roller, a center roller, and a lower roller are installed on the sliding door in the vertical direction of the vehicle with intervals, and an upper rail, a center rail, and a lower rail, on which the upper roller, the center roller, and the lower roller are installed, respectively, to be slid, are installed on the vehicle body.

The fixing member is installed on the top of the sliding door, and the slider is fastened to the upper roller.

An upper arm is interposed between the slider and the upper roller.

A bearing is interposed between the fixing member and the slider.

A sliding unit allowing the rail to be slidable on the vehicle body is provided between the vehicle body and the rail.

The sliding unit includes: a fixing member installed on the vehicle body in the longitudinal direction of the vehicle, and a slider slidably installed on the fixing member, and installed with the rail.

The vehicle is a commercial vehicle.

The vehicle is a truck.

The opening and closing structure of the sliding door for the vehicle according to the present disclosure having the above configuration may form the sliding structure of the top by the multi-stage in the sliding door of the commercial vehicle, thereby sufficiently opening the sliding door even if the installation space of the rail is narrower than the opening amount of the sliding door.

Therefore, as the constraint of the front design of the commercial vehicle is eliminated, the sufficient inclined angle is given to the front of the vehicle, such that the vehicle may have the beautiful design.

Further, it is also possible to improve the aerodynamic performance, thereby improving fuel efficiency.

DETAILED DESCRIPTION OF SPECIFIC EMBODIMENTS

Figure 1:
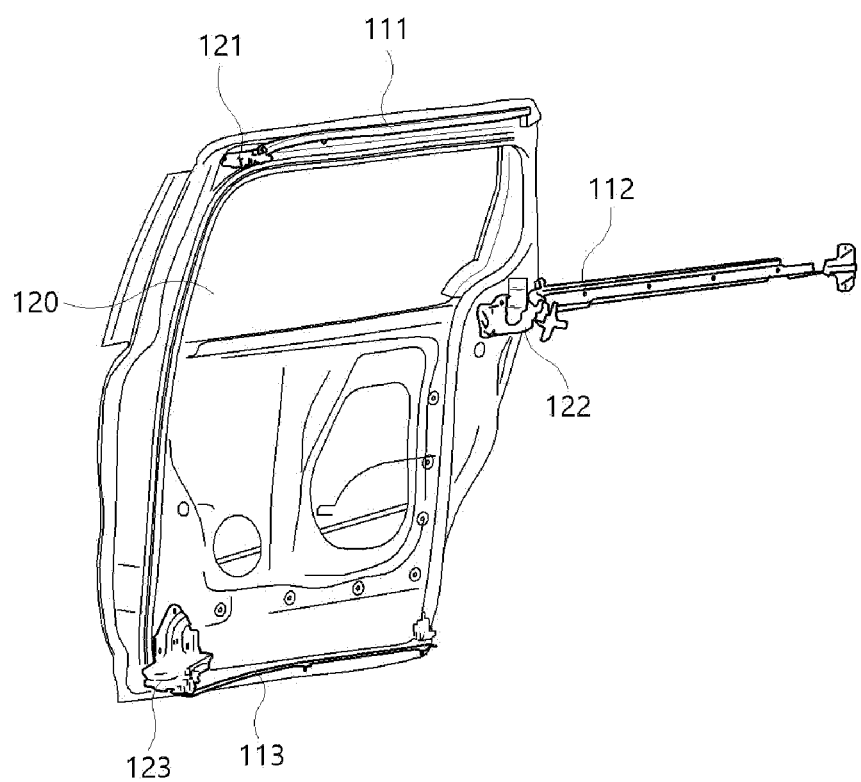
FIG. 1 is a perspective diagram illustrating an example of an opening and closing structure of a sliding door for a vehicle according to the related art.
Figure 2:
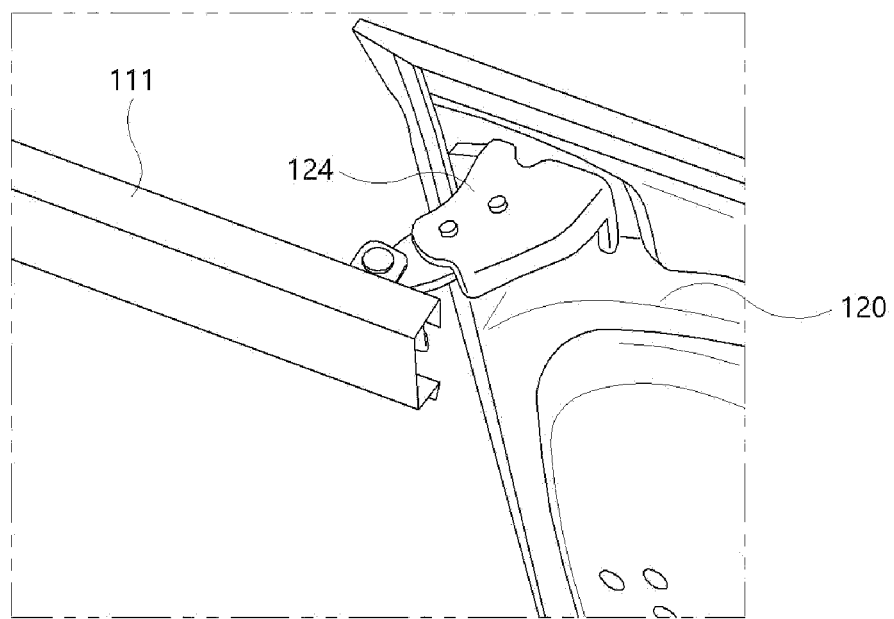
FIG. 2 is a perspective diagram illustrating a connection structure between an upper rail and a door in the opening and closing structure of the sliding door for the vehicle according to the related art.
Figure 3:
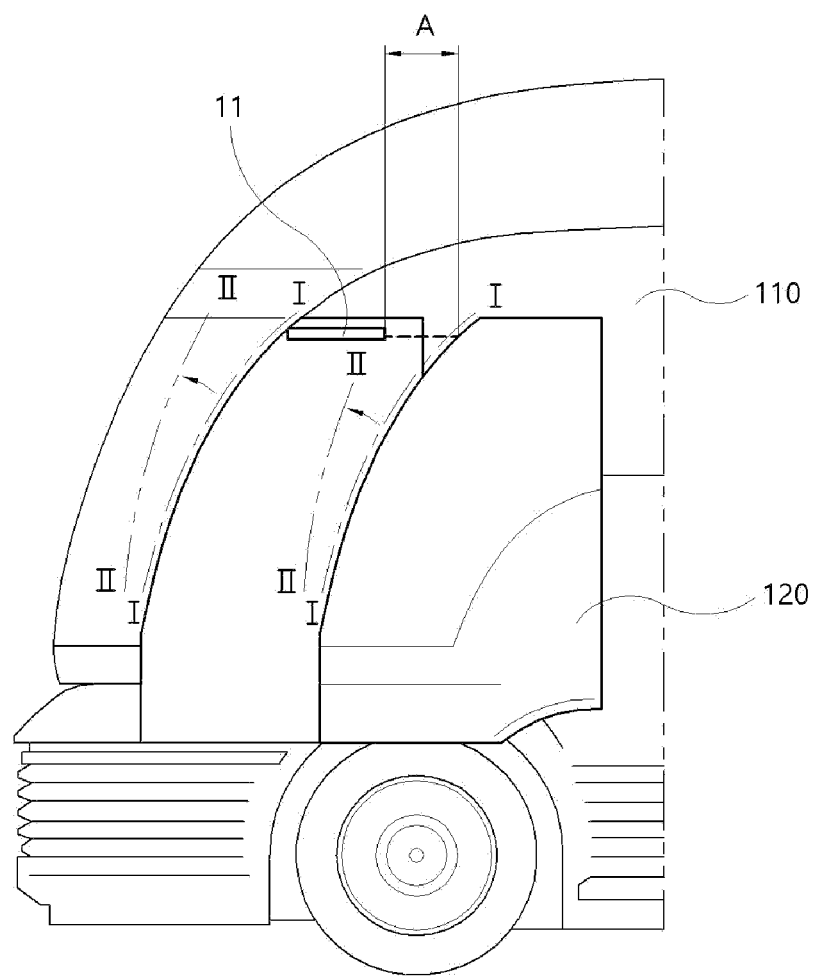
FIG. 3 is a side diagram illustrating the state where the opening amount of the sliding door is insufficient by the front design of the vehicle in the opening and closing structure of the sliding door for the vehicle according to the related art.

Hereinafter, an opening and closing structure of a sliding door for a vehicle according to the present disclosure will be described in detail with reference to the accompanying drawings.

An opening and closing structure of a sliding door for a vehicle according to an embodiment of the present disclosure includes a sliding door 20 opened and closed by sliding in a longitudinal direction of the vehicle on a side surface of the vehicle, at least one rail 11, 12, 13 provided in a longitudinal direction of the vehicle on one of a vehicle body 10 of the vehicle or the sliding door 20 thereof, rollers 21, 22, 23 provided on the other one of the vehicle body 10 or the sliding door 20, and sliding by being fitted into the rails 11, 12, 13, and a sliding unit installed on the side of the vehicle body 10 or the sliding door 20 on which the rollers 21, 22, 23 are installed, and sliding the rollers 21, 22, 23 in a direction in which the sliding door 20 is opened and closed, in which the rollers 21, 22, 23 are slid with respect to the vehicle body 10 and the sliding door 20.

The opening and closing structure of the sliding door for the vehicle according to an embodiment of the present disclosure may be applied to a commercial vehicle such as a truck or a bus.

The sliding door 20 is opened and closed by sliding in the longitudinal direction of the vehicle on the side surface of the vehicle. The passenger may get on or off the vehicle through the opening and closing of the sliding door 20.

The rails 11, 12, 13 and the rollers 21, 22, 23 are configured such that the sliding door 20 may be slid on the vehicle body 10.

At least one rail 11, 12, 13 is provided in the longitudinal direction of the vehicle on the vehicle body 10.

The rollers 21, 22, 23 are provided on the sliding door 20, and slide by being fitted into the rails 11, 12, 13.

The sliding door 20 may be supported by the rails 11, 12, 13 and the rollers 21, 22, 23 on a plurality of points, thereby securing the structural stability.

For example, when an upper roller 21, a center roller 22, and a lower roller 23 are disposed to be spaced apart from each other on the sliding door 20 in the vertical direction of the vehicle, and an upper rail 11, a center rail 12, and a lower rail 13, on which of the upper roller 21, the center roller 22, and the lower roller 23 are installed, respectively, to be slid, are disposed on the vehicle body 10, the sliding door 20 can be supported by three points.

When a length of one of the rails 11, 12, 13 is smaller than an opening amount of the sliding door 20 due to the inclination of the front design of the vehicle, one of the rails 11, 12, 13 and the rollers 21, 22, 23 is slidably installed on the vehicle body 10 or the sliding door 20.

One of the rails 11, 12, 13 and the rollers 21, 22, 23 may be slidable on the vehicle body 10 or the sliding door 20 to allow the rails 11, 12, 13 or the rollers 21, 22, 23 to slide by the insufficient levels of the lengths of the rails 11, 12, 13, such that the sliding door 20 may secure the sufficient opening amount.

The sliding unit capable of allowing the rollers 21, 22, 23 to slide on the sliding door 20 may be arranged between the sliding door 20 and the rollers 21, 22, 23. Alternatively, the sliding unit capable of allowing the rails 11, 12, 13 to slide on the vehicle body 10 may be arranged between the vehicle body 10 or the rails 11, 12, 13.

Further, the sliding unit may be applied to a portion in which the top of the sliding door 20 is connected to the vehicle body 10.

Figure 4:
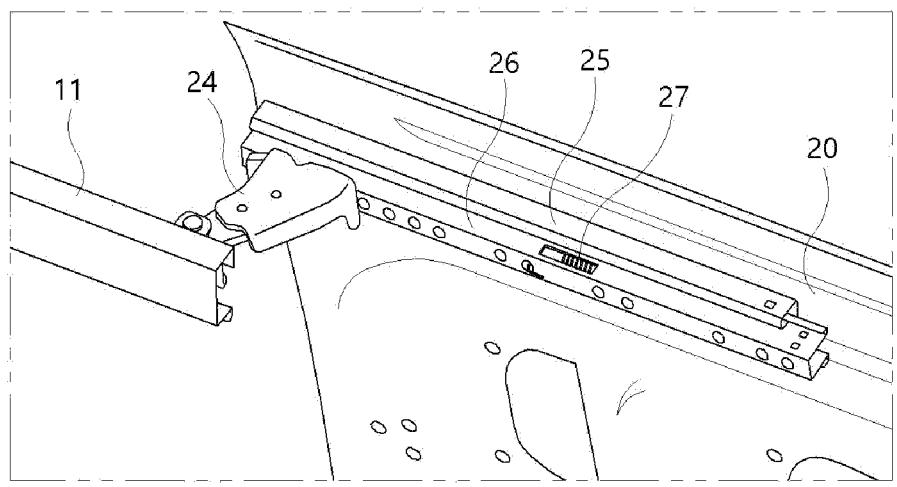
FIG. 4 is a perspective diagram illustrating a connection structure between an upper rail and a door in an opening and closing structure of a sliding door for a vehicle according to an embodiment of the present disclosure.
Figure 5:
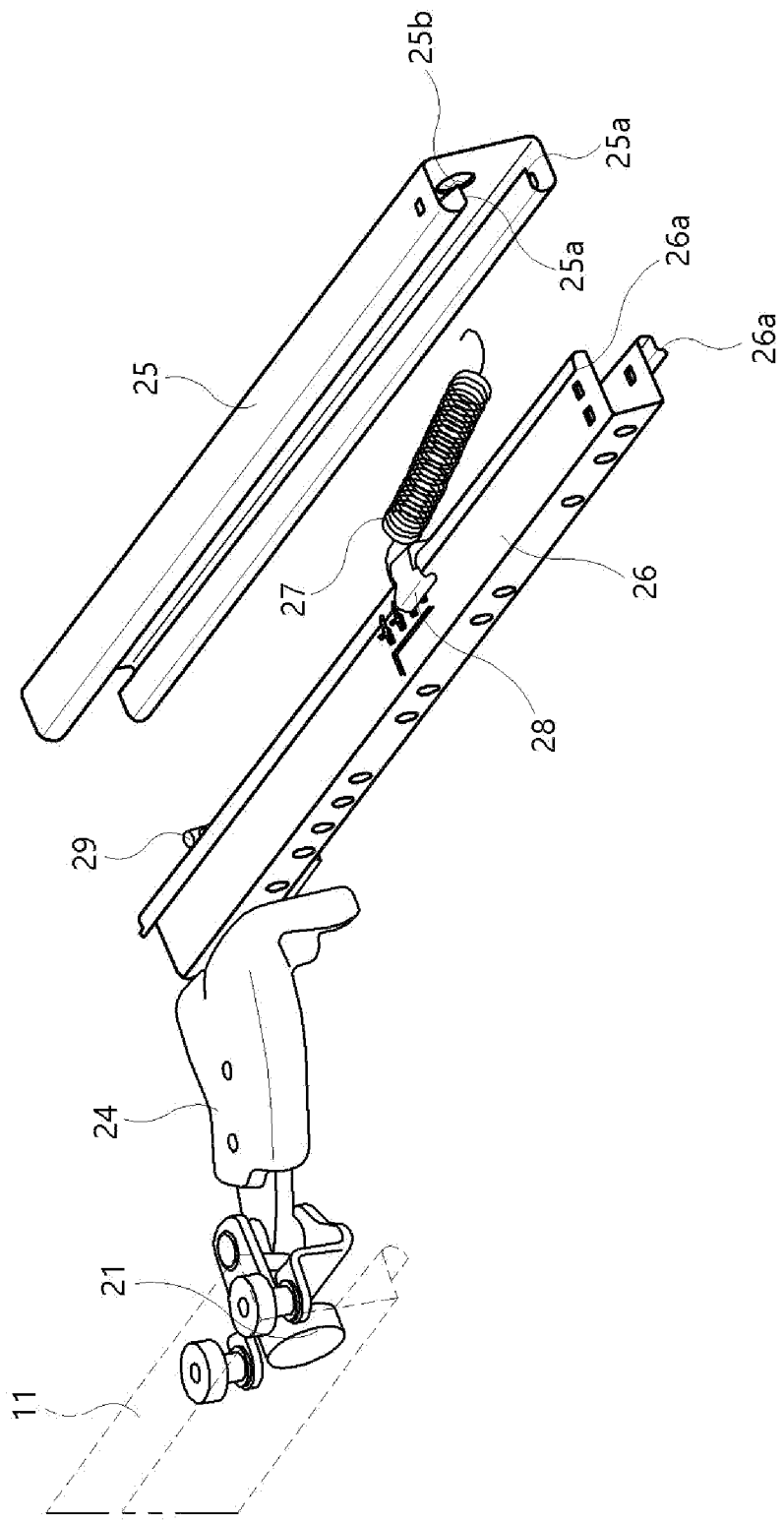
FIG. 5 is an exploded perspective diagram illustrating a connection structure between the upper rail and the door in the opening and closing structure of the sliding door for the vehicle according to an embodiment of the present disclosure.

Hereinafter, as illustrated in FIGS. 4 and 5, an example in which the sliding unit is provided between the sliding door 20 and the rollers 21, 22, 23, and the sliding unit is applied to the top of the sliding door 20 will be described. However, the sliding unit may also be applied between the vehicle body 10 and the rails 11, 12, 13, and may also be applied to the intermediate and the bottom of the sliding door 20.

The sliding unit is arranged between the sliding door 20 and the upper roller 21 such that the sliding door 20 may slide farther than the length of each of the rails 11, 12, 13, particularly, the upper rail 11.

The sliding unit may include a fixing member 25 installed on the sliding door 20 in the longitudinal direction of the vehicle, and a slider 26 slidably installed on the fixing member 25 and installed with the upper roller 21. The slider 26 slides with respect to the fixing member 25, such that the sliding door 20 is sufficiently opened even if the length of the upper rail 11 is smaller than the opening amount of the sliding door 20.

Viewing from the cross section, the fixing member 25 has one side fastened to the inside surface of the sliding door 20, top and bottom portions extending to the vehicle body 10, and another side open. Such a cross-sectional structure is formed in the longitudinal direction of the vehicle. The fixing member 25 may be fastened to the sliding door 20 through a fastening member such as a bolt.

Each of the top and bottom portions of the fixing member 25 have a grip part 25a to prevent the slider 26 from being separated in a width direction of the vehicle.

The fixing member 25 may include a coupling hole 25b to which one end of a return spring 27 to be described later extends through to be coupled.

The slider 26 may have the cross section symmetrical to the fixing member 25. That is, the slider 26 has the form which has one side fastened to the upper roller 21 and another side facing the fixing member 25 open. Each of the top and bottom of the slider 26 may have a coupling part 26a coupled to the grip part 25a.

The upper roller 21 is fastened to one side of the slider 26 and the upper rail 11 and the sliding door 20 are spaced apart from each other, such that an upper arm 24 can be arranged between the upper roller 21 and the slider 26. That is, the upper arm 24 is fastened to the slider 26, and the upper roller 21 is fastened to an end of the upper arm 24.

The grip part 25a and the coupling part 26a are coupled to be prevented from being separated from each other in the width direction of the vehicle, such that the slider 26 may slide in the longitudinal direction of the vehicle with respect to the fixing member 25. For example, the grip part 25a may have an end bent toward the sliding door 20 to accommodate the coupling part 26a, and the coupling part 26a may be bent in an opposite direction of the grip part 25a to be locked and coupled to the grip part 25a.

The slider 26 may slide in the fixing member 25 in the longitudinal direction of the vehicle by such a structure but is constrained in the width direction of the vehicle to be prevented from being separated. The fixing member 25 or the slider 26 may include stoppers (not illustrated) restricting the movement range of the slider 26.

A bearing 29 may be arranged between the fixing member 25 and the slider 26 for supporting the slider 26 within the fixing member 25 and reducing the friction when the slider 26 slides.

Further, a guide 28 guiding the sliding of the slider 26 may be installed on the slider 26.

An elastic member 27 has ends connected to the fixing member 25 and the slider 26, respectively. The elastic member 27 may be a return spring having a coil spring. The return spring 27 may have one end coupled to the coupling hole 25b of the fixing member 25, and the other end fixed to the guide 28.

When the sliding door 20 begins to be open from a closed state, the sliding unit slides the rollers 21, 22, 23 together up to rear ends of the rails 11, 12, 13 in the direction in which the sliding door 20 is opened, and when the rollers 21, 22, 23 reach the rear ends of the rails 11, 12, 13, the length of the sliding unit is elongated. When the sliding door 20 is closed, the aforementioned operation is performed in the reverse order thereof.

Here, the return spring 27 serves to determine which one of the upper roller 21 and the slider 26 is first operated. That is, the return spring 27 elastically supports the slider 26 by the fixing member 25 such that the upper roller 21 slides along the upper rail 11 earlier than the slider 26 when the sliding door 20 is opened, and the slider 26 slides along the fixing member 25 earlier than the upper roller 21 when the sliding door 20 is closed.

According to the above configuration, the sliding unit may also be applied between the vehicle body 10 and the rails 11, 12, 13, and may also be applied to the intermediate and bottom of the sliding door 20.

The opening and closing structure of the sliding door for the vehicle according to the present disclosure having the above configuration will be described as follows.

FIGS. 6 to 13 illustrate the state where the sliding door is being opened from the closed state and the state where the opening of the sliding door is completed.

Figure 6:
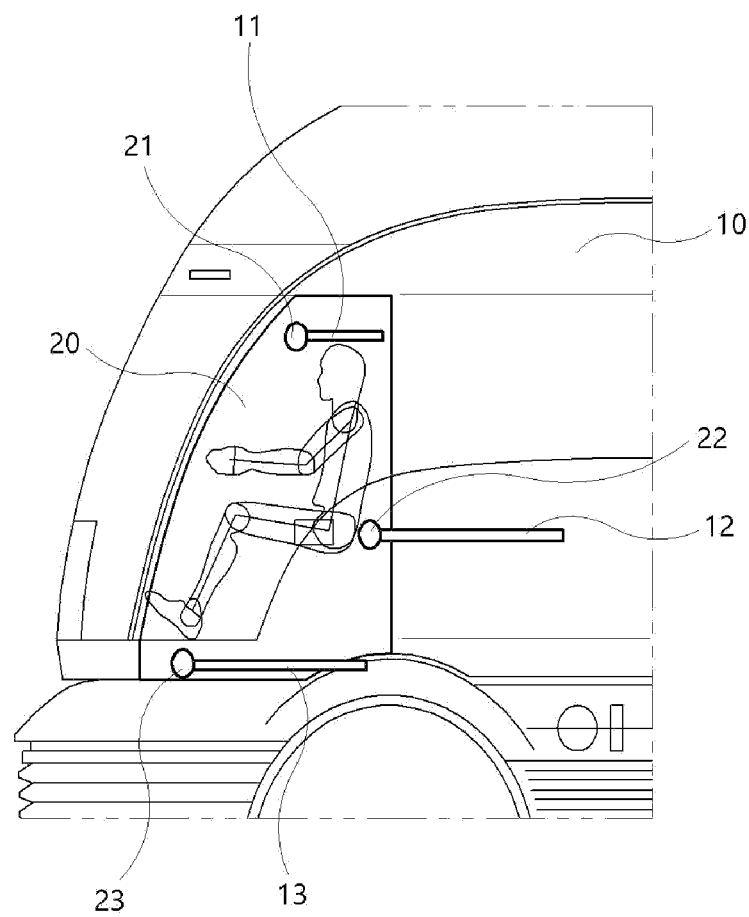
FIG. 6 is a side diagram illustrating the location relationship between a rail and a roller when the door is closed in a vehicle to which the opening and closing structure of the sliding door for the vehicle according to an embodiment of the present disclosure is applied.
Figure 7:
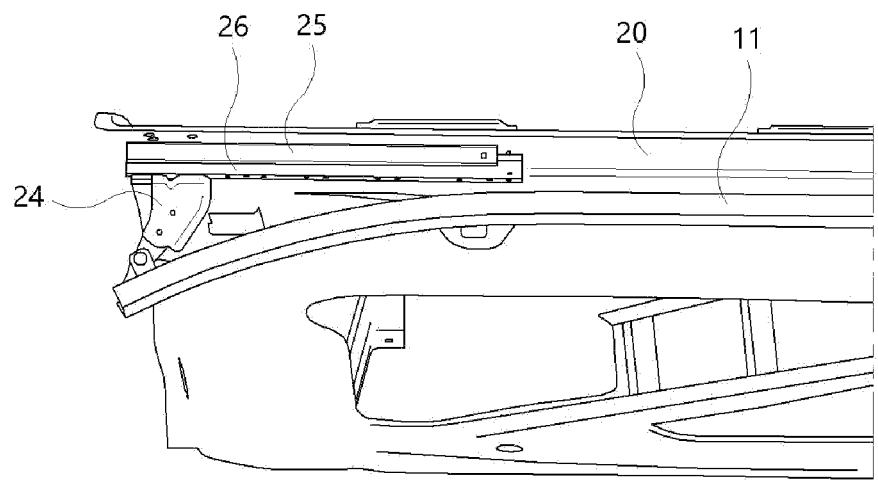
FIG. 7 is a perspective diagram of FIG. 6.

FIGS. 6 and 7 illustrate the state where the sliding door 20 is closed.

In this state, the upper roller 21 and the upper arm 24 are located on the front end of the upper rail 11. Further, the center roller 22 and the lower roller 23 are also located on the front ends of the center rail 12 and the lower rail 13, respectively.

When the sliding door 20 begins to be opened, the upper roller 21, the center roller 22, and the lower roller 23 begin to move to the rear of the vehicle along the upper rail 11, the center rail 12, and the lower rail 13 together with the sliding of the sliding door 20. Since the return spring 27 is elastically supported between the fixing member 25 and the slider 26, a process in which the upper roller 21 slides along the upper rail 11 is first performed.

Figure 8:
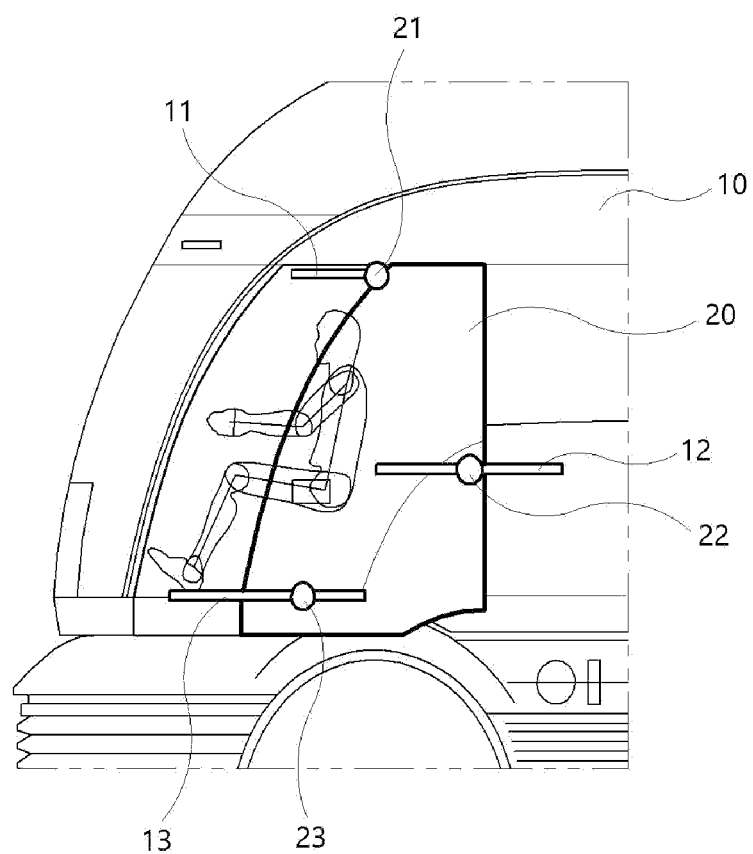
FIG. 8 is a side diagram illustrating the location relationship between the rail and the roller in the state where the door is being opened in the vehicle to which the opening and closing structure of the sliding door for the vehicle according to an embodiment of the present disclosure is applied.
Figure 9:
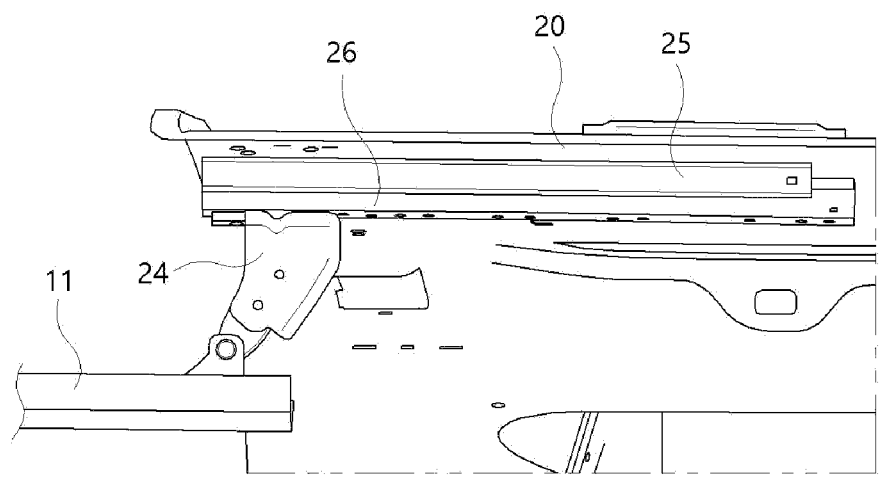
FIG. 9 is a perspective diagram of FIG. 8.
Figure 10:
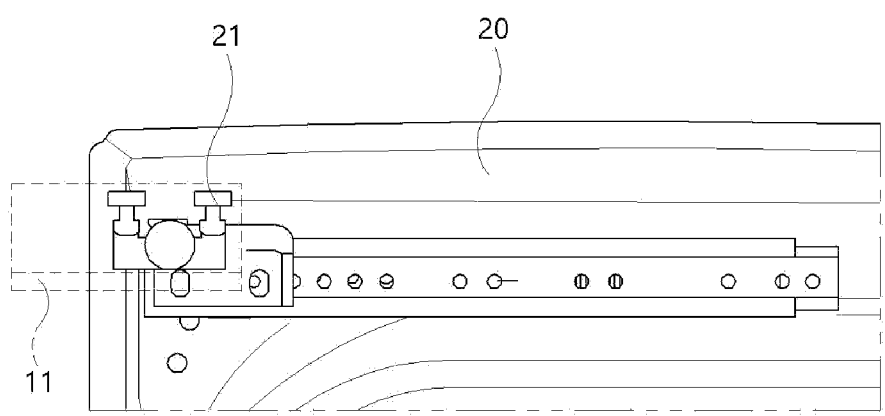
FIG. 10 is a side diagram illustrating the state illustrated in FIG. 8 therein.
Figure 11:
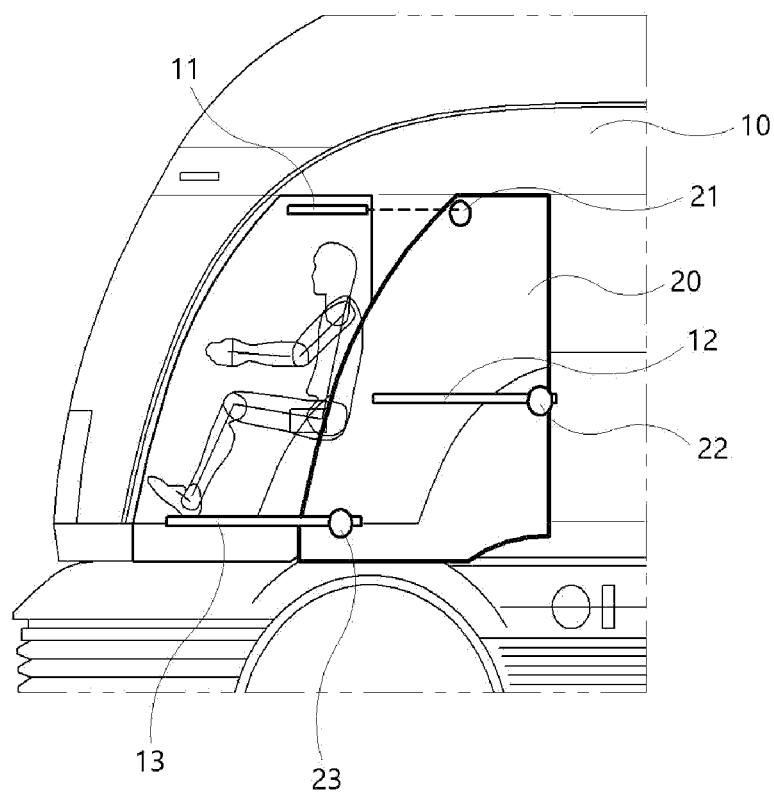
FIG. 11 is a side diagram illustrating the location relationship between the rail and the roller in the state where the opening of the door is completed in the vehicle to which the opening and closing structure of the sliding door for the vehicle according to an embodiment of the present disclosure is applied.
Figure 12:
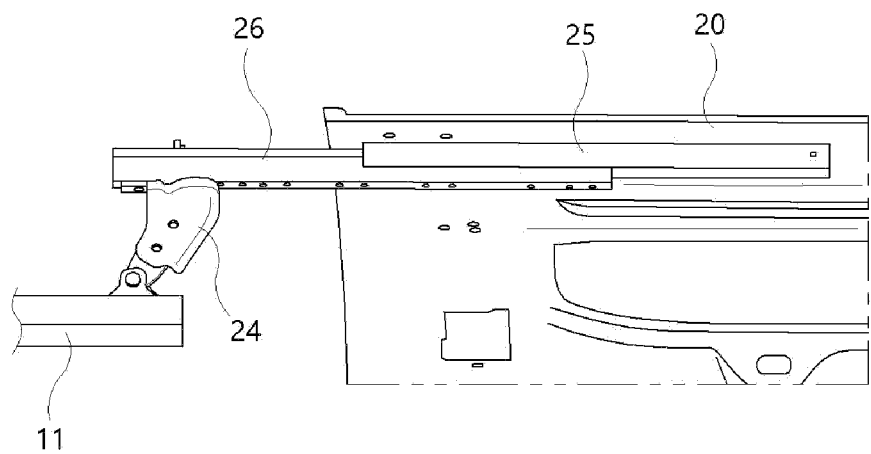
FIG. 12 is a perspective diagram of FIG. 11.
Figure 13:
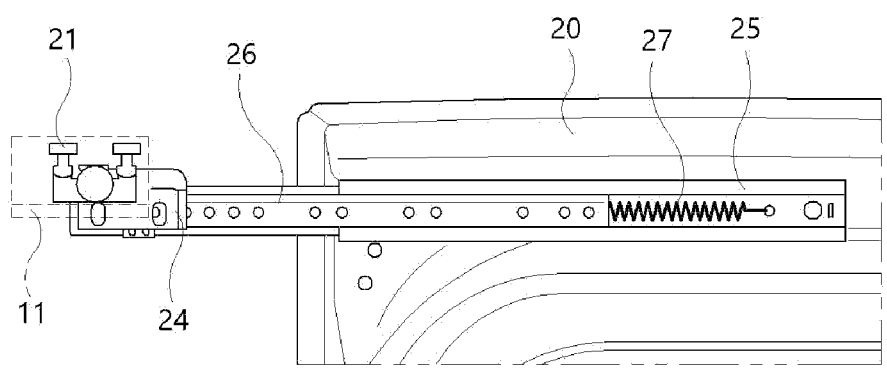
FIG. 13 is a side diagram illustrating the state illustrated in FIG. 11 therein.

When the sliding door 20 moves backward by a predetermined distance, as illustrated in FIGS. 8 to 10, the upper roller 21 is located on the rear end of the upper rail 11. At this time, the center roller 22 and the lower roller 23 are still located in the middle of the center rail 12 and the lower rail 13.

Then, when the sliding door 20 moves backward, the slider 26 begins to move to the rear of the vehicle with respect to the fixing member 25, in the state where the upper roller 21 is located on the rear end of the upper rail 11.

Further, the center roller 22 and the lower roller 23 also move to the rear side of the vehicle along the center rail 12 and the lower rail 13.

When the sliding door 20 is maximally opened, that is, when the sliding door 20 is opened to a maximum opening position, the slider 26 becomes the state of maximally moving to the rear of the vehicle with respect to the fixing member 25, and the center roller 22 and the lower roller 23 are also located on the rear ends of the center rail 12 and the lower rail 13.

According to such a configuration, the sliding door 20 may be opened by the displacement obtained by summing the length of the upper rail 11 and the sliding distance of the slider 26.

On the other hand, the sliding door 20 is closed is performed in the reverse order of the aforementioned description.

Particularly, in an initial closed state of the sliding door 20, the process in which the slider 26 moves to the front of the vehicle along the fixing member 25 by the return spring 27 is performed earlier than the process in which the upper roller 21 slides along the upper rail 11. That is, after the slider 26 completely moves to the front of the vehicle along the fixing member 25, the upper roller 21 moves to the front of the vehicle along the upper rail 11.

At this time, the center roller 22 and the lower roller 23 slide to the front side of the vehicle on the center rail 12 and the lower rail 13, respectively, by the displacement at which the sliding door 20 slides.

Through such a process, when the closing of the sliding door 20 is completed, the upper roller 21, the center roller 22, and the lower roller 23 are located on the front ends of the upper rail 11, the center rail 12, and the lower rail 13, respectively, such that the closing of the sliding door 20 is completed.

What is claimed is:

1. An opening and closing structure of a sliding door for a vehicle, the structure comprising:
    a sliding door disposed on a side surface of the vehicle and configured to be slidably open and closed in a longitudinal direction of the vehicle;
    at least one rail arranged on one of a vehicle body of the vehicle and the sliding door in the longitudinal direction of the vehicle;
    at least one roller arranged on the other one of the vehicle body and the sliding door, the at least one roller configured to slide while being fitted in the at least one rail; and
    a sliding unit disposed on a side of the vehicle body or the sliding door on which the at least one roller is arranged, the sliding unit configured to slide the at least one roller in a direction in which the sliding door slides,
    wherein the at least one roller is configured to slide with respect to the vehicle body and the sliding door,
    wherein the sliding unit, which is configured to allow the at least one roller to be slidable on the sliding door, is arranged between the sliding door and the at least one roller,
    wherein the sliding unit comprises:
        a fixing member disposed on the sliding door in the longitudinal direction of the vehicle; and
        a slider slidably disposed on the fixing member and including the at least one roller, and
    wherein the opening and closing structure further includes an elastic member having ends connected to the fixing member and the slider, respectively.

2. The opening and closing structure of claim 1, wherein the fixing member includes a grip part surrounding top and bottom portions of the slider, and
    wherein the slider includes a coupling part coupled to the grip part constraining the slider with respect to the fixing member in a width direction of the vehicle.

3. The opening and closing structure of claim 2, wherein the grip part has an end bent toward the sliding door and accommodating the coupling part; and
    wherein the coupling part is configured to be bent in a direction opposite to a bending direction of the grip part to be locked to the grip part.

4. The opening and closing structure of claim 1, wherein the sliding unit is configured to slide the at least one roller upward to a rear end of the at least one rail together in a direction in which the sliding door is open when the sliding door begins to be open from a closed state, and
    wherein a length of the sliding unit increases as the at least one roller moves toward the rear end of the at least one rail.

5. The opening and closing structure of claim 1, wherein the elastic member elastically supports the slider by the fixing member, such that the at least one roller slides along the at least one rail before the slider starts sliding when the sliding door is open, and the slider slides along the fixing member before the at least one roller starts sliding when the sliding door is closed.

6. The opening and closing structure of claim 1, wherein the elastic member includes a return spring having a coil spring.

7. The opening and closing structure of claim 1, wherein the at least one roller includes an upper roller, a center roller, and a lower roller spaced apart from each other on the sliding door in a vertical direction of the vehicle, and
    wherein the at least one rail includes an upper rail, a center rail, and a lower rail, on which the upper roller, the center roller, and the lower roller are slidably disposed, respectively, are disposed on the vehicle body.

8. The opening and closing structure of claim 7, wherein the fixing member is disposed on a top portion of the sliding door, and
    wherein the slider is disposed be to fastened to the upper roller.

9. The opening and closing structure of claim 7, wherein an upper arm is interposed between the slider and the upper roller.

10. The opening and closing structure of claim 1, wherein a bearing is interposed between the fixing member and the slider.

11. The opening and closing structure of claim 1, wherein the sliding unit is arranged between the vehicle body and the at least one rail.

12. The opening and closing structure of claim 11, wherein the sliding unit comprises:
    the fixing member disposed on the vehicle body in the longitudinal direction of the vehicle; and
    the slider slidably disposed on the fixing member, and including the at least one rail.

13. The opening and closing structure of claim 1, wherein the vehicle includes a commercial vehicle.

14. The opening and closing structure of claim 1, wherein the vehicle includes a truck.

* * * * *